United States Patent [19]

Callaghan et al.

[11] Patent Number: 4,471,853
[45] Date of Patent: Sep. 18, 1984

[54] MOUNTING ARRANGEMENT FOR AN EXHAUST SYSTEM

[75] Inventors: William I. Callaghan, Mentor; Douglas L. Uhler, Madison, both of Ohio

[73] Assignee: Towmotor Corporation, Mentor, Ohio

[21] Appl. No.: 505,587

[22] Filed: Jun. 20, 1983

[51] Int. Cl.$^3$ ............................................ B60K 13/04
[52] U.S. Cl. ................................. 180/309; 180/89.2; 181/262
[58] Field of Search ............... 180/309, 89.2; 181/207, 181/227, 262, 263

[56] References Cited

U.S. PATENT DOCUMENTS

| | | | |
|---|---|---|---|
| 2,841,232 | 7/1958 | Loeffler | 180/82.2 |
| 2,992,035 | 7/1961 | Tell et al. | 180/89.2 X |
| 3,687,224 | 8/1972 | Lundin | 181/33 A |
| 3,866,580 | 2/1975 | Whitehurst et al. | 123/41.7 |
| 3,910,041 | 10/1975 | Gibson | 180/309 X |
| 3,942,600 | 3/1976 | DePriester et al. | 180/64 A |
| 4,020,915 | 5/1977 | Darnell et al. | 180/89.2 X |
| 4,133,547 | 1/1979 | Fox | 180/309 X |
| 4,265,332 | 5/1981 | Presnall et al. | 181/211 |
| 4,308,930 | 1/1982 | Iida et al. | 180/89.2 |
| 4,343,374 | 8/1982 | Hollandsworth | 180/89.2 X |
| 4,402,383 | 9/1983 | Bailey | 181/207 X |

FOREIGN PATENT DOCUMENTS 750170 6/1956 United Kingdom ................ 180/309
870112 6/1961 United Kingdom ................ 180/309

Primary Examiner—Joseph F. Peters, Jr.
Assistant Examiner—Michael Mar
Attorney, Agent, or Firm—Alan J. Hickman

[57] ABSTRACT

This invention relates to a mounting arrangement (10) for resiliently connecting an exhaust stack (12) to an exhaust pipe (14) and a frame (18) which eliminates the problems of vibration, noise transfer, joint failure, high exhaust temperatures, complexity, and inability to quickly assemble and disassemble. The mounting arrangement (10) has first and second spaced apart elastomeric devices (60,80) for resiliently connecting the exhaust stack (12) to the frame (18), a support bracket (98) and an exhaust pipe (14). The first elastomeric device (60) supports an open end of the exhaust pipe (14) in the exhaust stack (12) and on the frame (18) and the second elastomeric device (80) engages the support bracket (98) and which retains the first elastomeric device (60) in contact with the frame (18). A passage arrangement (74) passes cooling air flow past the first elastomeric device to cool the first elastomeric device (60) and the exhaust stack (12). Thus the problems of vibration, noise transfer, joint failure, high exhaust temperature, complexity and difficulty of assembly and disassembly are eliminated. The mounting arrangement (10) is particularly suited for connecting the exhaust stack (12) to the frame (18) and an overhead guard (116) of a lift truck (20).

20 Claims, 5 Drawing Figures

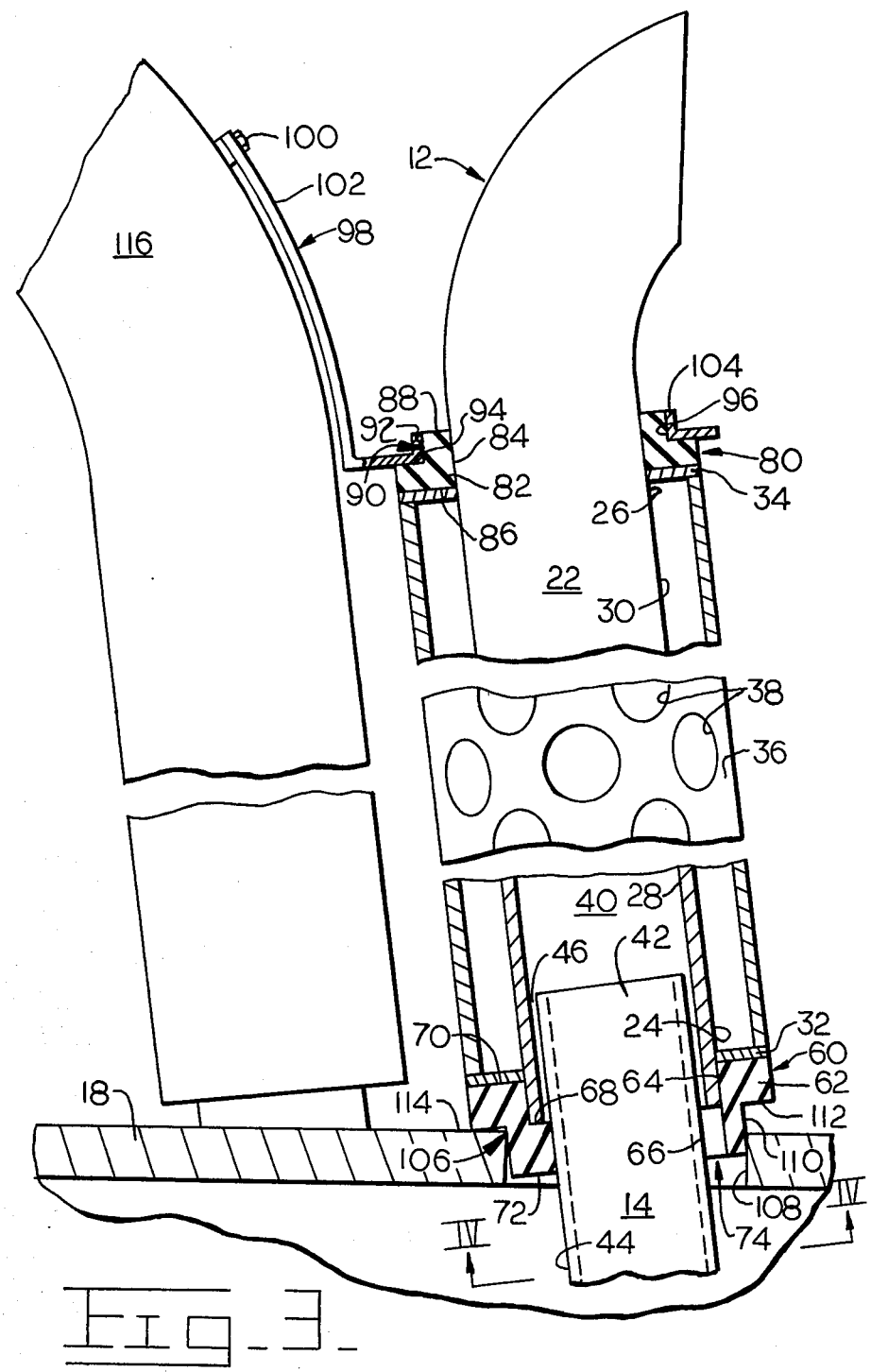
Fig_3_

MOUNTING ARRANGEMENT FOR AN EXHAUST SYSTEM

DESCRIPTION

TECHNICAL FIELD

This invention relates generally to a mounting arrangement for an exhaust system and more particularly to a mounting arrangement for resiliently connecting an exhaust stack to a frame and an exhaust pipe.

BACKGROUND ART

Exhaust systems of the type used to direct exhaust from an engine to a location spaced from the engine are well known in the art. Such systems are frequently employed, for example, on stationary devices such as air compressors, electric generator sets and the like and mobile devices such as earthmoving, material handling, and transportation vehicles. These exhaust systems, and particularly those used on vehicles often direct the exhaust to exit at a location elevationally higher than the vehicle operator. In doing so there is usually an exposed length of exhaust pipe in relatively close proximity to the operator. Because the exhaust system passes hot gasses the system itself tends to get hot which requires special treatment of the exposed length of the system.

U.S. Pat. Nos. 4,265,332 dated May 5, 1981 to Lance O. Presnall et al and 3,866,580 dated Feb. 18, 1975 to Gerald E. Whitehurst et al, and British Pat. Nos. 750,170 dated June 13, 1956 and 870,112 dated June 14, 1961 all treat the heat problem by shielding the exposed length of exhaust pipe coaxially with an exhaust stack and pass either induced or forced cooling air therebetween. This solution is effective in reducing the temperature of the exhaust stack but creates several additional problems.

Usually the exhaust pipe is coaxially disposed in an unsupported manner in the exhaust stack. Relative motion between the exhaust stack and the exhaust pipe encountered during normal vehicle operation will cause intermittent contact between the stack and pipe and generate undesirable noise. This noise is particularly annoying to the operator of the vehicle when the exhaust stack is in close proximity to the vehicle operator.

Rigid connection between the exhaust stack and exhaust pipe is not acceptable since engine noise and exhaust heat would be transferred from the pipe to the stack. Also relative movement of the exhaust stack and exhaust pipe due to operation of the vehicle would dynamically load the rigid connection and cause failure thereof.

It is often a common practice in lift trucks to resiliently mount the exhaust stack on an overhead guard by flexible straps and rigidly connect the exhaust stack to the exhaust pipe for support purposes. This arrangement does not permit cooling air flow to be used to reduce exhaust stack heat nor does it permit independent removal of the exhaust stack and exhaust pipe from one another or the overhead guard from the vehicle without disassembling the entire exhaust system.

The present invention is directed to overcoming one or more of the problems set forth above.

DISCLOSURE OF THE INVENTION

In one aspect of the present invention a mounting arrangement for connecting an exhaust stack to a frame is provided. The exhaust stack has an exhaust passage disposed therein which is open at first and second spaced apart end portions. An exhaust pipe having an open end portion is disposed in the exhaust passage at the first end portion. A first elastomeric member resiliently connects the first end portion of the exhaust stack to the open end portion of the exhaust pipe and resiliently supports the exhaust stack on the frame, and a second elastomeric device resiliently connects the second end portion of the exhaust stack to a support bracket connected to the frame. A passage is provided for passing cooling air flow past the first elastomeric member and into the exhaust passage.

The first elastomeric device which resiliently supports the exhaust pipe in the exhaust stack isolates the pipe from contact with the stack and thus eliminates noise transfer therebetween. Since the first elastomeric device permits a preselected limited amount of movement of the exhaust pipe relative to the exhaust stack the potential for joint failure common with rigid connections is eliminated. Because the first elastomeric device resiliently supports the exhaust stack on the frame and not on the exhaust pipe dynamic load transfer from the exhaust stack to the exhaust pipe is avoided. Also, the first and second elastomeric devices serve to isolate the exhaust stack from the frame and reduce the transfer of noise. Because a single support bracket connects the exhaust stack to the frame the exhaust stack is easily removed without requiring removal of the exhaust pipe.

The provision for passing cooling air flow past the first elastomeric device and into the exhaust passage permits the use of an elastomeric material in an environment limited to relatively high temperature materials and maintains the exhaust stack at a cooler temperature.

BRIEF DESCRIPTION OF THE DRAWINGS

FIG. 3 is a diagrammatic enlarged view of the exhaust stack and mounting arrangement of FIG. 1 with portions of the exhaust stack and frame broken away to show the mounting arrangement in greater detail;

FIG. 4 is a diagrammatic end view taken along lines IV—IV of FIG. 3 showing a first elastomeric bushing and cooling air flow passages disposed therein; and FIG. 5 is a diagrammatic cross-sectional view taken along lines V—V of FIG. 4 showing the first elastomeric bushing in even greater detail.

BEST MODE FOR CARRYING OUT THE INVENTION

Figure 1:
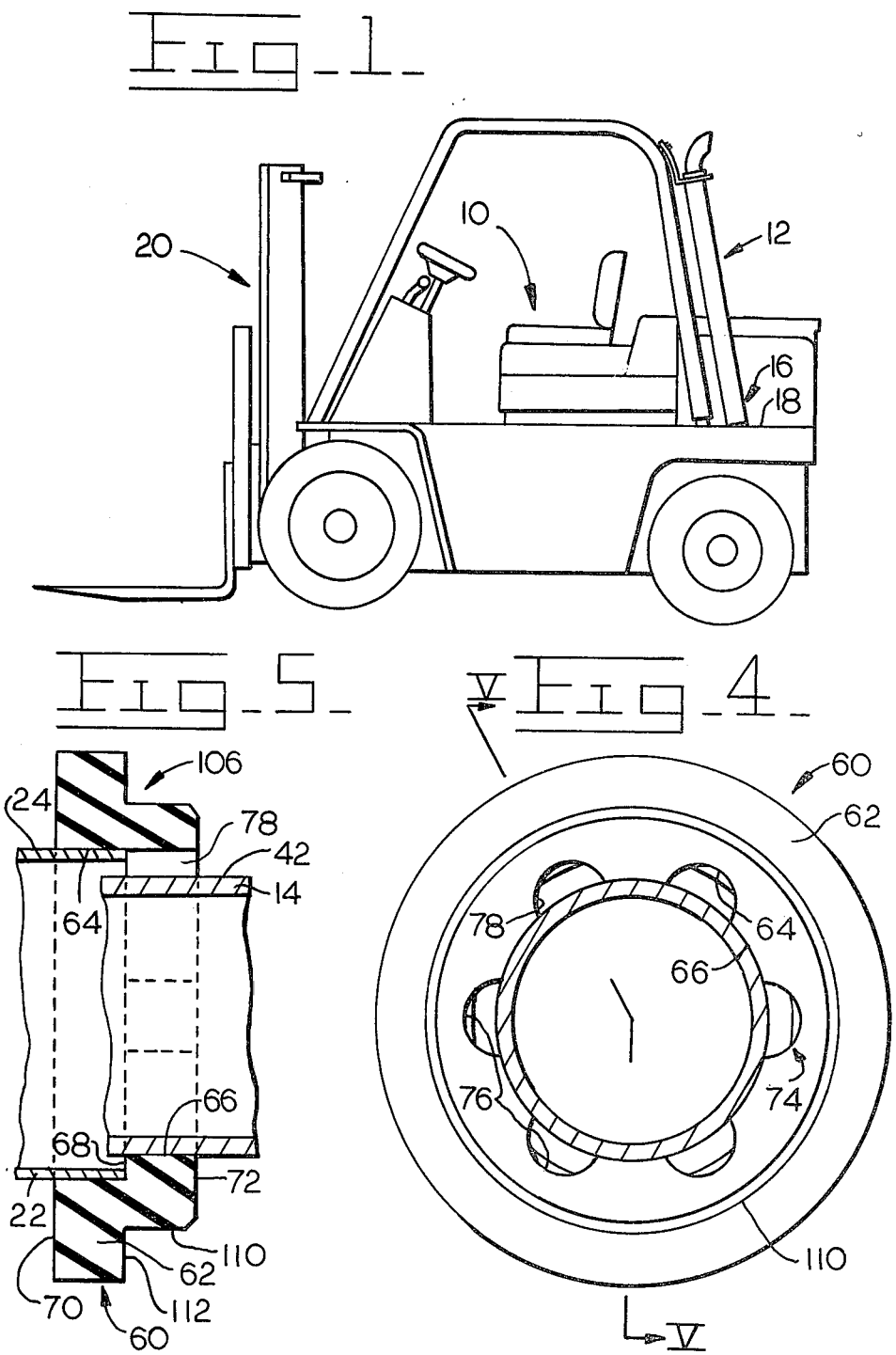
FIG. 1 is a diagrammatic side elevational view of an embodiment of the present invention showing the exhaust stack located adjacent the operator's station and being connected to the frame and overhead guard of a lift truck.

With reference to the drawings, a mounting arrangement 10 for resiliently connecting an exhaust stack 12 and exhaust pipe 14 of an exhaust system 16 to one another and to a frame 18 is provided. Preferably the mounting arrangement 10 is intended for use on a vehicle 20, such as a lift truck, however, other uses such as on earthmovers, electric sets, air compressors and the like are also contemplated.

With reference to FIG. 3 the exhaust stack 12 has a tubular body portion 22. The tubular body portion 22 has first and second spaced apart end portions 24 and 26, an inner cylindrical surface 28, an outer cylindrical surface 30 and first and second stops 32 and 34 connected to the outer cylindrical surface 30 at the first and second end portions 24 and 26, respectively. The stops 32 and 34 are preferably ring shaped members disposed circumferentially about the outer cylindrical surface 30 and extending radially relative thereto. A heat screen 36 having a plurality of spaced apart perforations 38 disposed therein is circumferentially wrapped about the first and second stops 32 and 34 and fastened thereto in any suitable manner, such as by welding. The heat screen 36 therefore overlays the tubular body portion 22 in a spaced apart circumferential relationship therewith and prevents contact with the tubular body portion 22. Since the heat screen is connected to both stops 32 and 34 axial rigidity of the stops relative to the tubular body portion 22 is maintained.

An exhaust passage 40 defined by the inner cylindrical surface 28 passes through the exhaust stack and opens at the first and second end portions 24 and 26 of the tubular body. An open end portion 42 of exhaust pipe 14 is disposed in the exhaust passage 40 at the first end portion 24 of the exhaust stack 12 and extends axially therein a preselected distance. The exhaust pipe has an outer cylindrical surface 44 which is smaller in diameter than the inner surface 28 of the exhaust stack tubular body portion 22. Therefore an annular opening 46 is provided between the outer surface 30 of the exhaust pipe 44 and inner surface 28 of the exhaust stack 12 tubular portion 22.

Figure 2:
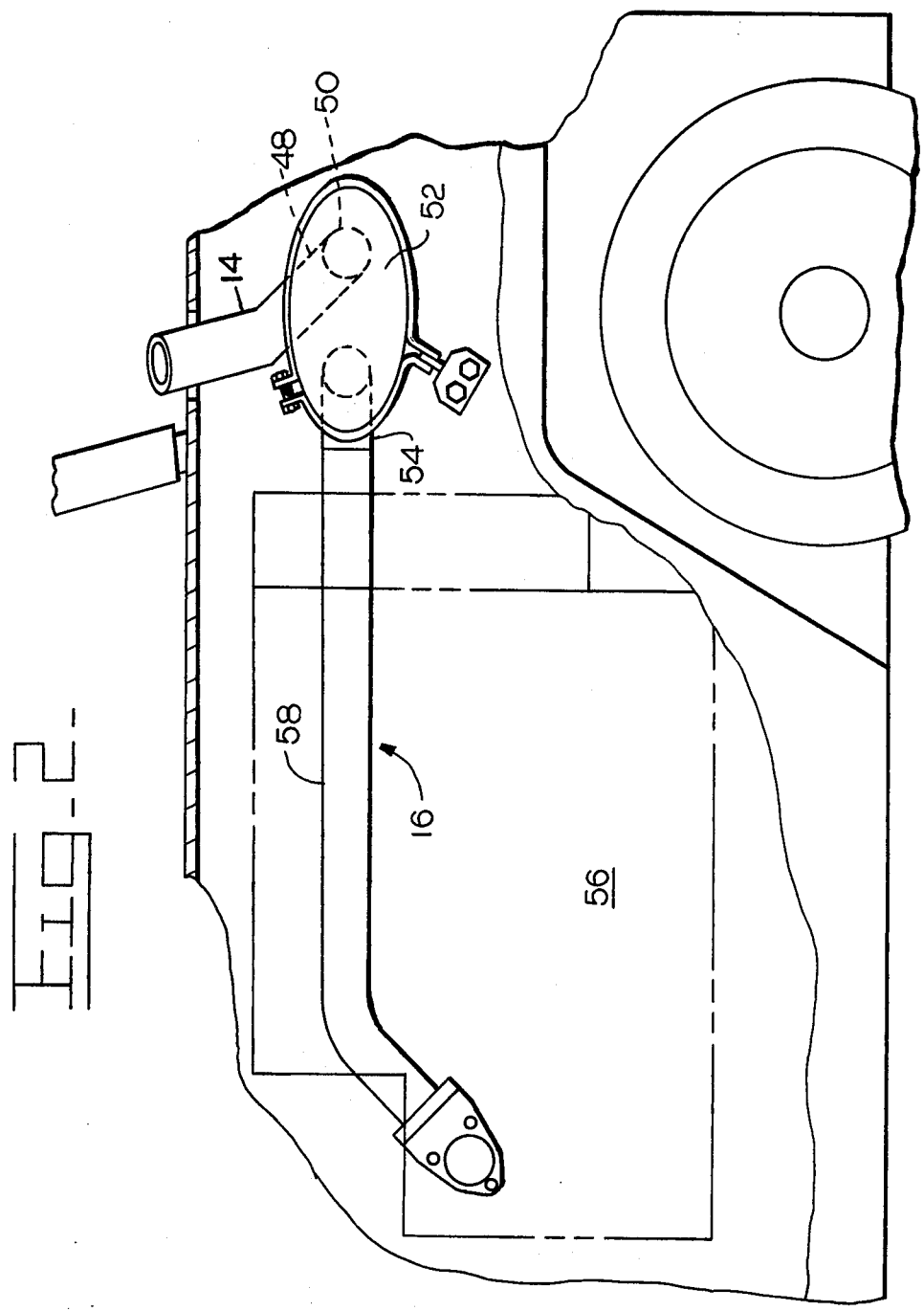
FIG. 2 is an enlarged partial diagrammatic side elevational view of FIG. 1 with portions of the lift truck broken away to show the exhaust system on the lift truck.

As best seen in FIG. 2, the exhaust pipe 14 is connected at an inlet end portion 48 of the exhaust pipe 14 to an outlet 50 of a muffler 52 and an inlet 54 of the muffler 52 is connected to a resiliently mounted engine 56 via a manifold pipe 58. Thus, exhaust gasses are passed by the manifold pipe 58 from the engine 56 to the muffler 52 for sound treatment and from the muffler 52 through the open end 42 of the exhaust pipe 14 and into the exhaust passage 40. The flow of exhaust gasses exiting the open end 42 of the exhaust pipe 14 into the larger diameter exhaust passage 40 induces cooling air flow to pass through the annular opening 46 to combine with the exhaust gasses and cool the exhaust gasses. This combined flow exits the exhaust stack 12 at the second end portion 26 of the tubular body portion 22.

Since the engine 56 is resiliently mounted to the frame 18, movement of the engine due to normal operation thereof will be transferred to the exhaust pipe 14. This movement prohibits rigid connection between the exhaust stack 12 and exhaust pipe 14 or between the exhaust pipe 14 and frame. To solve this problem a first elastomeric device 60 (FIGS. 3 and 5) is provided for resiliently connecting the first end portion 24 of the exhaust stack 12 to the open end portion 42 of the exhaust pipe 14. The first elastomeric device 60 includes a first elastomeric bushing 62 of preferably a silicon rubber material having a Durometer A hardness of 70. The first elastomeric bushing 62 has first and second preferably concentrically aligned cylindrical bores 64 and 66 of different diameters disposed therein and defining a step 68 therebetween. The first and second bores 64,66 are open to one another and open at first and second ends 70 and 72 of the first bushing 62, respectively. The first end portion 24 of the tubular body portion 22 of the exhaust stack 12 is disposed in and engaged with the first bore 64 and the open end portion 42 of the exhaust pipe 14 is disposed in and in sliding engagement with the second bore 66. Preferably, first elastomeric bushing 62 maintains the exhaust pipe 14 and exhaust stack tubular body portion 22 in coaxial alignment with one another and prevents intermittent contact between inner surface 28 and outer surface 44 due to relative motion therebetween while permitting a limited amount of motion therebetween. Because the first bushing 62 is elastomeric, noise transfer between the exhaust pipe 14 and exhaust stack 12 is appreciably reduced.

A passage arrangement 74 for passing cooling air flow from a location outside the exhaust stack 12 past the first elastomeric device 60 and into the exhaust passage 40 is provided to reduce the temperature of the exhaust gas, cool the first elastomeric bushing 62 so that it may live in what is otherwise too hot an environment, and reduce the temperature of the exhaust stack 12. The passage arrangement 74 includes a plurality of apertures 76 disposed through the first elastomeric bushing 62 and opening in the annular space 46. The apertures 76 are preferably equally radially spaced apart semicircular shaped grooves 78 axially oriented relative to the second bore 66. Each aperture 76 opens in the second bore, the step 68 and the second end 72 of the first bushing 62 and aligned in a tangent relationship with the first bore 64. These apertures each pass induced cooling air flow in the manner previously described.

The mounting arrangement 10 further includes a second elastomeric device 80 for resiliently connecting the second end portion 26 of the exhaust stack 12 tubular body portion 22 to the frame 18. The second elastomeric device 80 has a second elastomeric bushing 82 constructed of the same material as the first elastomeric bushing 62. A bore 84 is disposed through the second bushing 82 and opens at first and second ends 86 and 88 thereof. The second bushing 82 also has a pilot portion 90 defined by a cylindrical outer surface 92 and step 94. The cylindrical outer surface 92 and the bore 84 are preferably concentric. The second end portion of 26 of the exhaust stack 12 is disposed in the bore 84 of the second elastomeric bushing 82 and engaged therewith. The pilot portion 90 extends in an axial direction relative to the tubular body portion 22 and away from the first end portion 24 of the tubular body portion 22. The pilot portion 90 is disposed in a pilot bore 96 of a support bracket 98 so that the outer surface 92 engages the pilot bore 96 and the step 94 contacts the bracket 98. The bracket 98 is removably secured to the frame 18 by a fastener 100. Preferably, the bracket 98 is formed of sheet steel having an arcuate leg portion 102 and an annular lip 104 defining pilot bore 96.

A pilot portion 106 of the first elastomeric bushing 62 is associated with a pilot bore 108 of frame 18. The pilot portion 106 has an outer cylindrical surface 110 concentric with the first and second bores 64 and 66 and a radially extending step surface portion 112. The outer cylindrical surface 110 is positioned to extend in a direction axially away from the second end portion 26 of exhaust stack 12 and is disposed in the pilot bore 108. The step surface portion 112 abuts a surface 114 of the frame 18 adjacent the pilot bore 108 and supports the exhaust stack axially thereon. Although the pilot bore 108 has been described as being disposed in the frame 108, the frame may include a separate bracket with a bore therein for supporting the exhaust stack 12 and is to be considered an equivalent.

The first ends 70 and 86 of the first and second elastomeric bushings 62 and 82 abut the first and second stops 32 and 34, respectively. The support bracket 98 forceably urges the second elastomeric bushing 82 against the second stop 34. Because of the resiliency of the second bushing 82, the tubular portion 22 of the exhaust stack 12 is axially urged toward the surface 114 of frame 18 which result in the first stop 32 urging the first elastomeric bushing 62 toward the frame 18 to maintain contact between surface 114 and step surface 112.

When used on a lift truck the support bracket 98 is removably connected to an overhead guard 116 mounted on the frame 14 of the vehicle 20. The exhaust stack 16 is easily removed from and installed on the vehicle 20 by connecting or removing the support bracket 98 therefrom. Since the first and second elastomeric bushings 62 and 82 isolate the exhaust stack from the frame and the overhead guard 116, noise transfer is appreciably reduced. The mounting arrangement 10 eliminates structural failure normally encountered at the junction of the connection between exhaust stack 12 and exhaust pipe 14 due to the resiliency thereof.

INDUSTRIAL APPLICABILITY

In operation and with reference to the drawings, the mounting arrangement 10 facilitates ease of installation and removal of the exhaust stack 12 on the vehicle without the necessity of disturbing the exhaust system 16. To remove the exhaust stack 12 all that is required is removal of the support bracket 98 and axially slidably disengaging the first elastomeric bushing 62 from engagement with the open end portion 42 of the exhaust pipe. Removal of the bracket 98 is accomplished by screwthreadably removing fastener 100 and slidably disengaging the pilot bore 96 from engagement with the pilot portion 90 of the second elastomeric bushing 82.

Installation of the exhaust stack 12 on the vehicle 20 is accomplished by axially slidably engaging the first elastomeric bushing 62, which is mounted on the first end portion of the exhaust stack 12, with the open end portion 42 of the exhaust pipe 14, engaging the pilot bore 96 of the support bracket with the pilot portion 90 of the second elastomeric bushing 82 and connecting the leg portion 102 of support bracket 98 to the overhead guard 116 by fastener 100.

Since the first elastomeric bushings 62 is sandwiched between the first stop 32 and surface 114 and the second elastomeric bushing 82 is sandwiched between the second stop 34 and the support bracket 98 axial movement of the exhaust pipe is limited to the amount of compressive deformation of the first and second elastomeric bushings 62 and 82. The amount of radial exhaust stack movement permitted is similarly a function of deformation of the first and second elastomeric bushings 62 and 82 but in a radial direction. Also the degree of looseners of fit between the pilot bore 108 of frame 18 and the pilot portion 106 of the first elastomeric bushing 62, and the degree of looseners of fit between the pilot bore 96 of the support bracket 98 and the pilot portion 90 of the second elastomeric device 82 is a determining factor in the amount of radial movement of the exhaust stack 12.

Because the open end portion 42 of the exhaust pipe 14 is slidably disposed in the second bore 66 of the first elastomeric bushing 62 a slight degree of axial movement of the exhaust pipe 14 relative to the exhaust stack due to normal engine and vehicle dynamics is permitted. Likewise, a small amount of movement of the open end portion 42 of the exhaust pipe 14 relative to the exhaust stack in other directions is permitted as a result of the elasticity of the first elastomeric bushing 62. It should be noted that the first elastomeric bushing 62 is the only supporting member for the open end portion 42 of the exhaust pipe 14 and thus additional brackets and the like are eliminated.

During operation of the engine 56, exhaust gasses which pass from the open end portion 42 of the exhaust pipe 14 into the exhaust passage 24 induce cooling air to flow from a location outside the exhaust passage 24 through the apertures 76, into the annular opening 46, and into the exhaust passage 24. This cooling air flow maintains the temperature of the first elastomeric bushing 62 at an acceptable operating temperature while reducing the exhaust gas temperature ultimately that of the exhaust stack 12.

Other aspects, objects and advantages of this invention can be obtained from a study of the drawings, the disclosure and appended claims.

We claim:

1. A mounting arrangement (10), comprising:
  a frame (18);
  an exhaust stack (12) having an exhaust passage (40) and first and second spaced apart end portions (24,26), said exhaust passage (40) being open at said first and second end portions (24,26);
  a support bracket (98) connected to said frame (18);
  an exhaust pipe (14) having an open end portion (42), said open end portion (42) being disposed in said exhaust passage (40) at the first end portion (24) of said exhaust stack (12);
  first elastomeric means (60) for resiliently connecting the open end portion (42) of the exhaust pipe (14) to the first end portion (24) of the exhaust stack (12) and for resiliently supporting the exhaust stack (12) on the frame (18);
  second elastomeric means (80) for resiliently connecting the second end portion (26) of said exhaust stack (12) to said support bracket (98);
  first and second annular stop members (32, 34) rigidly secured to said first and second end portions (24, 26) respectively, a cylindrical heat screen (36) disposed about said exhaust stack (12) and spaced therefrom, said heat screen (36) being connected to said first and second annular stop members (32, 34), said first elastomeric means (60) being located between the frame (18) and the first annular stop member (32), and said second elastomeric means (80) being located between the support bracket (98) and the second annular stop member (34);
  passage means (74) for passing cooling air past said first elastomeric means (60) and into said exhaust passage (40).

2. The mounting arrangement (10) as set forth in claim 1 wherein said first elastomeric means (60), includes;
  a first elastomeric bushing (62) having first and second bores (64,66) disposed therein, said bores (64,66) opening into one another, said exhaust stack (12) first end portion (24) being disposed in said first bore (64) and engaged therewith, and said exhaust pipe (14) open end portion (42) being disposed in said second bore (66) and engaged therewith.

3. The mounting arrangement (10) as set forth in claim 2 wherein said first and second bores (64,66) are axially aligned, said exhaust pipe (14) open end portion (42) extending past the first end portion (24) of said exhaust stack (12) and into the exhaust passage (40) a preselected longitudinal distance, and said first and second bores (64,66) of the first bushing (62) supporting the exhaust stack (12) and exhaust pipe (14) in coaxial alignement with each other.

4. The mounting arrangement (10) as set forth in claim 2 wherein said exhaust stack (12) has a cylindrical inner surface (28) defining said exhaust passage (40) and said exhaust pipe (14) has a cylindrical outer surface (44), said cylindrical inner surface (28) of the exhaust stack (12) being radially spaced from the cylindrical outer surface (44) of the exhaust pipe (14) and defining an annular space (46) therebetween.

5. The mounting arrangement (10) as set forth in claim 4 wherein said passage means (74), includes;
  a plurality of radially spaced apart apertures (76) disposed axially in said first elastomeric bushing (62), said apertures (76) passing through said first elastomeric bushing (62) and opening in said annular space (46).

6. The mounting arrangement (10) as set forth in claim 5 wherein said plurality of apertures (76) are semi-circular shape grooves (78) opening in said second bore (66), said semi-circular shaped grooves (78) being equally spaced apart.

7. The mounting arrangement (10) as set forth in claim 2 wherein said passage means (74), includes;
  a plurality of apertures (76) disposed through said first elastomeric bushing (62) and opening in said exhaust passage (40).

8. The mounting arrangement (10) as set forth in claim 2 wherein said second elastomeric means (80), includes;
  a second elastomeric bushing (82) having a bore (84), said exhaust stack second end portion (26) being disposed in the bore (84) of said second elastomeric bushing 82 and engageable therewith.

9. A mounting arrangement (10) for connecting an exhaust stack (12) to a frame (18), comprising:
  said exhaust stack (12) having an exhaust passage (40) and first and second spaced apart end portions (24,26), said exhaust passage (40) being open at said first and second end portions (24,26);
  first and second stops (32,34) connected to said exhaust stack (12) at spaced apart axial locations thereon;
  a support bracket (98) connected to said frame (18);
  an exhaust pipe (14) having an open end portion (42), said open end portion (42) being disposed in said exhaust passage (40) at the first end portion (24) of said exhaust stack (12);
  first elastomeric means (60) for resiliently connecting the open end portion (42) of the exhaust pipe (14) to the first end portion (24) of the exhaust stack (12) and for resiliently supporting the exhaust stack (12) on the frame (18), said first elastomeric means including a first elastomeric bushing (62) having first and second bores (64,66), said bores (64,66) opening into one another, said exhaust stack first end portion (24) being positioned in said first bore (64) and in contact with said first bushing (62), said exhaust pipe open end portion (42) being disposed in said second bore (66) and engaged therewith;
  second elastomeric means (80) for resiliently connecting the second end portion (26) of said exhaust stack (12) to said support bracket (98), said second elastomeric means (80) including a second elastomeric bushing (82) having a bore (84), said exhaust stack second end portion (26) being positioned in the bore (84) of said second elastomeric bushing (82) and contactable with said second bushing, said first and second elastomeric bushings (62,82) being engaged with said first and second stops (32,34), respectively, and said frame (18) and support bracket (98), respectively; and
  passage means (74) for passing cooling air past said first elastomeric means (60) and into said exhaust passage (40).

10. The mounting arrangement (10) as set forth in claim 9, including;
  fastener means (100) removably connecting said support bracket (98) to said frame (18).

11. The mounting arrangement (10) as set forth in claim 9 wherein said frame (18) has a pilot bore (108) disposed therein and said first elastomeric bushing (62) has a pilot portion (106), said pilot portion (106) being disposed in said pilot bore (108).

12. The mounting arrangement (10) as set forth in claim 9 wherein said first elastomeric bushing (62) is sandwiched between said frame (18) and said first stop (32) and said second elastomeric bushing (82) is sandwiched between said second stop (34) and said support bracket (98).

13. The mounting arrangement (10) as set forth in claim 9 wherein said second elastomeric bushing (82) has a pilot portion (90) and said support bracket (98) has a pilot bore (96) disposed therein, said pilot portion (90) of the second elastomeric bushing (82) being disposed in the pilot bore (96) of the support bracket (98).

14. The mounting arrangement (10) as set forth in claim 9 wherein said first and second elastomeric bushings (62,82) being formed of a silicon rubber material.

15. A mounting arrangement (10) for resiliently connecting an exhaust stack (12) to a vehicle (20); comprising:
  said exhaust stack (12) having first and second end portions (24,26) and an exhaust passage (40) opening at said first and second end portions (24,26);
  first and second stops (32,34) connected to said exhaust stack (12) at longitudinally spaced apart locations along said exhaust stack (12);
  an exhaust pipe (14) having an open end portion (42), said open end portion (42) being disposed coaxially in said exhaust passage (40) at the first end portion (24) of said exhaust stack (12);
  a support member (98) connected to said vehicle (20);
  a first elastomeric bushing (62) resiliently connecting the first end portion (24) of said exhaust stack (12) to the open end portion (42) of said exhaust pipe (14) and supporting said exhaust stack (12) on said vehicle (20), said first elastomeric bushing (62) being positioned between said first stop (32) and said vehicle (20);
  a second elastomeric bushing (82) resiliently connecting the second end portion (26) of said exhaust stack (12) to said support bracket (98), said second elastomeric bushing (82) being positioned between said second stop (34) and said support bracket (98); and
  passage means (74) for passing cooling air in a direction past said first elastomeric bushing (62) and into said exhaust passage (40).

16. The mounting arrangement (10) as set forth in claim 15 wherein said first elastomeric bushing (62), includes;
  a pilot portion (106) and first and second axially aligned bores (64,66) disposed therein, said exhaust stack (12) first end portion (24) being disposed in engagement with said first bore (64), said exhaust pipe (14) open end portion (42) being disposed in engagement with said second bore (66), said vehicle (20) having a pilot bore (108) disposed therein, said pilot portion (106) of the first elastomeric bushing (62) being disposed in the pilot bore (108) of the vehicle (20), and said passage means (74), includes;

a plurality of apertures (76) disposed in said first elastomeric bushing (62) axially relative to said first and second bores (64,66), said apertures (76) passing through said first elastomeric bushing (62) and opening into said exhaust passage (40).

17. The mounting arrangement (10) as set forth in claim 15 wherein said second elastomeric bushing (82), includes;

a bore (84) disposed in said second bushing (82) and a pilot portion (90), said exhaust stack (12) second end portion (26) being disposed in the bore (84) of said second elastomeric bushing (82), said support bracket (98) having a pilot bore (96) disposed therein, said pilot portion (90) of the second elastomeric bushing (82) being disposed in and engaged with the pilot bore (96) of the support bracket (98).

18. The mounting arrangement (10) as set forth in claim 15 wherein said support bracket (98) urges said second elastomeric bushing (82) against said second stop (34) and said first elastomeric bushing (62) against said first stop (32) and said vehicle (20).

19. The mounting arrangement (10) as set forth in claim 15, including;

an overhead guard (116) connected to said vehicle, said support bracket (98) being connected to said overhead guard.

20. In a vehicle (20) having a frame (18), an overhead guard (116) connected to said frame (18), an internal combustion engine (56), and an exhaust pipe (14) having an open end portion (42) and being connected to said engine (56); the improvement comprising:

an exhaust stack (12) having first and second spaced apart end portions (24,26) and an exhaust passage (40) opening at the first and second end portions (24,26);

said frame (18) having an aperture (108) disposed therethrough;

a first resilient elastomeric bushing (62) having a step surface portion (112), a pilot portion (106) and first and second bores (64,66), said exhaust stack (12) first end portion (24) being disposed in said first bore (64), said exhaust pipe (14) open end portion (42) being disposed in said second bore (66) and opening into said exhaust passage (40), said pilot portion (106) of the first elastomeric bushing (62) being disposed in the aperture (108) of said frame (18) and said step surface portion (112) of the first elastomeric bushing (62) being contactably engaged with the frame (18);

a support bracket (98) having a pilot bore (96) disposed therein;

a second resilient elastomeric bushing (82) having a step surface portion (94), a pilot portion (90) and a bore (84), said exhaust stack (12) second end portion (26) being disposed in the bore (84) of said second resilient bushing (82), said pilot portion (90) of the second resilient bushing (82) being disposed in said pilot bore (96) of the support bracket (98), and said step surface portion (94) of the second elastomeric bushing (82) being engaged with said support bracket (98), said support bracket (98) being connected to said overhead guard (116);

stop means (32,34) for preventing movement of said first and second resilient elastomeric bushings (62,82) along said exhaust stack (12) in directions toward one another; and passage means (74) for passing cooling air flow past said first elastomeric bushing (62) and into said exhaust passage (40).

* * * * *